United States Patent
Grieco et al.

(10) Patent No.: US 9,366,312 B2
(45) Date of Patent: Jun. 14, 2016

(54) TORSION DAMPING DEVICE COMPRISING ELASTIC MEMBERS HELD INDIVIDUALLY IN POSITION BY PHASE WASHER

(75) Inventors: Giovanni Grieco, Colombes (FR); Norberto Termenon, Paris (FR)

(73) Assignee: Valeo Embrayages (FR)

( * ) Notice: Subject to any disclaimer, the term of this patent is extended or adjusted under 35 U.S.C. 154(b) by 0 days.

(21) Appl. No.: 14/115,409

(22) PCT Filed: Apr. 24, 2012

(86) PCT No.: PCT/FR2012/050894
§ 371 (c)(1),
(2), (4) Date: Nov. 4, 2013

(87) PCT Pub. No.: WO2012/150402
PCT Pub. Date: Nov. 8, 2012

(65) Prior Publication Data
US 2014/0076682 A1   Mar. 20, 2014

(30) Foreign Application Priority Data

May 4, 2011   (FR) ..................................... 11 53794
May 4, 2011   (FR) ..................................... 11 53795
Dec. 22, 2011  (FR) ..................................... 11 62283

(51) Int. Cl.
F16F 15/123   (2006.01)
F16H 45/02    (2006.01)
F16F 15/14    (2006.01)

(52) U.S. Cl.
CPC ..... *F16F 15/12373* (2013.01); *F16F 15/12313* (2013.01); *F16F 15/145* (2013.01); *F16H 2045/0231* (2013.01)

(58) Field of Classification Search
CPC .............. F16F 15/121; F16F 15/12373; F16F 15/12313; F16H 2045/0231
USPC ........................ 192/212, 213, 55.61; 464/68.1
See application file for complete search history.

(56) References Cited

U.S. PATENT DOCUMENTS

| 4,775,042 A | 10/1988 | Kohno et al. | |
| 6,343,684 B1 * | 2/2002 | Lohaus et al. | 192/213 |
| 2005/0023103 A1 * | 2/2005 | Mizukami | F16F 15/12313 192/213.2 |
| 2009/0045025 A1 * | 2/2009 | Bassett | 192/70.17 |
| 2009/0223767 A1 * | 9/2009 | Arhab et al. | 192/3.29 |

(Continued)

FOREIGN PATENT DOCUMENTS

| DE | 102008032459 | 2/2009 |
| FR | 2940825 | 7/2010 |

*Primary Examiner* — Richard Lorence
*Assistant Examiner* — Lillian Nguyen
(74) *Attorney, Agent, or Firm* — Berenato & White, LLC

(57) ABSTRACT

A torsion damping device (10) of an automotive temporary coupling system, comprising: a torque input element (12A, 12B) and a torque output element (18); an upstream circumferentially acting elastic member (36A) capable of being loaded by or of loading the input element (12A, 12B); a downstream circumferentially acting elastic member (36B) capable of loading or of being loaded by the output element (18); a radial phase washer (40A, 40B) arranged so that the two elastic members (36A, 36B) are mounted in series; each elastic member (36A, 36B) is received circumferentially between a phasing face (50A, 50B) and an oppositely located radial retention face (52B, 52A) of the phase washer (40A, 40B), the circumferential distance (D) between said faces (50A, 50B, 52B, 52A) being equal at most to the circumferential length of the elastic member at rest.

20 Claims, 6 Drawing Sheets

(56) References Cited

U.S. PATENT DOCUMENTS

2010/0133062 A1* 6/2010 Maienschein .............. 192/30 V
2010/0269497 A1* 10/2010 Engelmann et al. ............ 60/338
2011/0287844 A1* 11/2011 Steinberger .................. 464/68.8
2012/0160628 A1* 6/2012 Vanni et al. .................. 192/3.28

* cited by examiner

TORSION DAMPING DEVICE COMPRISING ELASTIC MEMBERS HELD INDIVIDUALLY IN POSITION BY PHASE WASHER

CROSS-REFERENCE TO RELATED APPLICATIONS

This application relates to French Patent Application Nos. 1153794 and 1153795 filed May 4, 2011 and French Patent Application No. 1162283 filed Dec. 22, 2011, of which the disclosures are incorporated herein by reference and to which priority is claimed.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The invention relates to a torsion damping device between an axially oriented coaxial drive shaft and driven shaft in an automotive temporary coupling system, comprising elastic members, and to a hydrodynamic converter equipped with such a damping device.

2. Description of Related Art Including Information Disclosed Under 37 CFR 1.97 and 1.98

The invention relates more particularly to a torsion damping device between an axially oriented coaxial drive shaft and driven shaft in an automotive temporary coupling system, the device having:
- a torque input element and a torque output element;
- at least one first, upstream circumferentially acting elastic member, an upstream circumferential end face of which is capable of being loaded by or of loading the input element;
- at least one second, downstream circumferentially acting elastic member, a downstream circumferential end face of which is capable of loading or of being loaded by the output element;
- at least one first radial phase washer, the downstream end face of each upstream elastic member being capable of loading or of being loaded by an upstream radial phasing face of the phase washer, and the upstream end face of each downstream elastic member being capable of being loaded by or of loading a downstream radial phasing face of the phase washer, such that the two elastic members are mounted in series.

Damping devices of this kind are installed, for example, in clutch arrangements such as hydrodynamic converters. A converter of this kind has, for example, a rotating housing that is capable of transmitting drive torque to the damping device by means of a friction locking clutch, sometimes called a "lock-up" clutch. The converter also has a turbine wheel mounted rotatably inside the housing.

A combustion engine exhibits irregularities due to the succession of combustion events in the engine cylinders. Torsion damping means allow these irregularities to be filtered before the drive torque is transmitted to a transmission. This is because the vibrations must be damped before they enter the transmission and produce unacceptably troublesome noise.

To accomplish this, it is known to interpose a torsion damping device between the drive shaft and the transmission shaft. The torsion damping device is generally arranged in a clutch system that allow temporary rotational connection of the drive shaft to the transmission shaft.

The torsion damping device generally has circumferentially acting elastic members that are interposed between a torque input element and a torque output element.

In so-called "long travel" damping devices, the elastic members are mounted, in groups of at least two elastic members, in series between the input element and output element.

In such a configuration, a phasing tab is interposed between the two elastic members of said group. This ensures that the elastic members work substantially in circumferential compression. The phasing tabs are, for example, carried by phase washers.

The adjacent elastic members of two successive groups are received in washer receptacles or windows that have a guidance function. Each window is delimited circumferentially by an abutment tab.

The receptacles are formed into washers that have a guidance function. These washers are constituted, for example, by the phase washers; in this case the abutment tabs that circumferentially delimit each window are phasing tabs.

The damping device is sometimes configured in such a way that the phase washer is rotationally connected to the converter turbine wheel.

In this case, when drive torque is inputted through the converter turbine wheel, certain elastic members (the upstream members) are not loaded. These elastic members are capable of sliding circumferentially in their window, thus causing parasitic noise to appear.

BRIEF SUMMARY OF THE INVENTION

The invention proposes a damping device of the kind described previously, wherein each elastic member is received circumferentially between the associated phasing face and an oppositely located associated radial retention face of the phase washer, the circumferential distance between a phasing face and the oppositely located retention face being equal at most to the circumferential length of the elastic member at rest.

All the elastic members are thus retained in position even when only the downstream members are loaded by the passage of torque.

According to other characteristics of the invention:
  the circumferential distance between each phasing face and the oppositely located retention face is less than the length of the elastic member at rest, so that the elastic member is received in circumferentially constrained fashion between the retention face and the associated phasing face;

the elastic members are arranged on the circumference of a single circle, the phasing faces thus being carried by one common radial phasing tab of the phase washer which is interposed between the upstream elastic member and the downstream elastic member;

the device has two phase washers that are arranged axially on either side of the input and output elements and that are fastened onto one another, the phase washers having means for capturing the elastic members in order to retain them axially and radially in position.

According to a second aspect, the invention relates to a hydrodynamic converter having a turbine wheel, a locking clutch, and a damping device according to the first aspect of the invention, each phase washer being rotationally connected to the turbine wheel while the input element is rotationally connected to the locking clutch.

BRIEF DESCRIPTION OF THE SEVERAL VIEWS OF THE DRAWING(S)

Other characteristics and advantages of the invention will become evident upon reading the detailed description that follows, an understanding of which may be gained by referring to the attached drawings in which.

DETAILED DESCRIPTION OF THE INVENTION

The following orientations will be used for the description hereinafter:

"axial": oriented from back to front along the rotation axis of the damping device, and indicated by arrow "A" of the Figures;

"radial": oriented orthogonally to the axis of the damping device from inside to outside moving away from said axis;

"circumferential": oriented orthogonally to the axis of the damping device and orthogonally to the radial direction.

Figure 1:
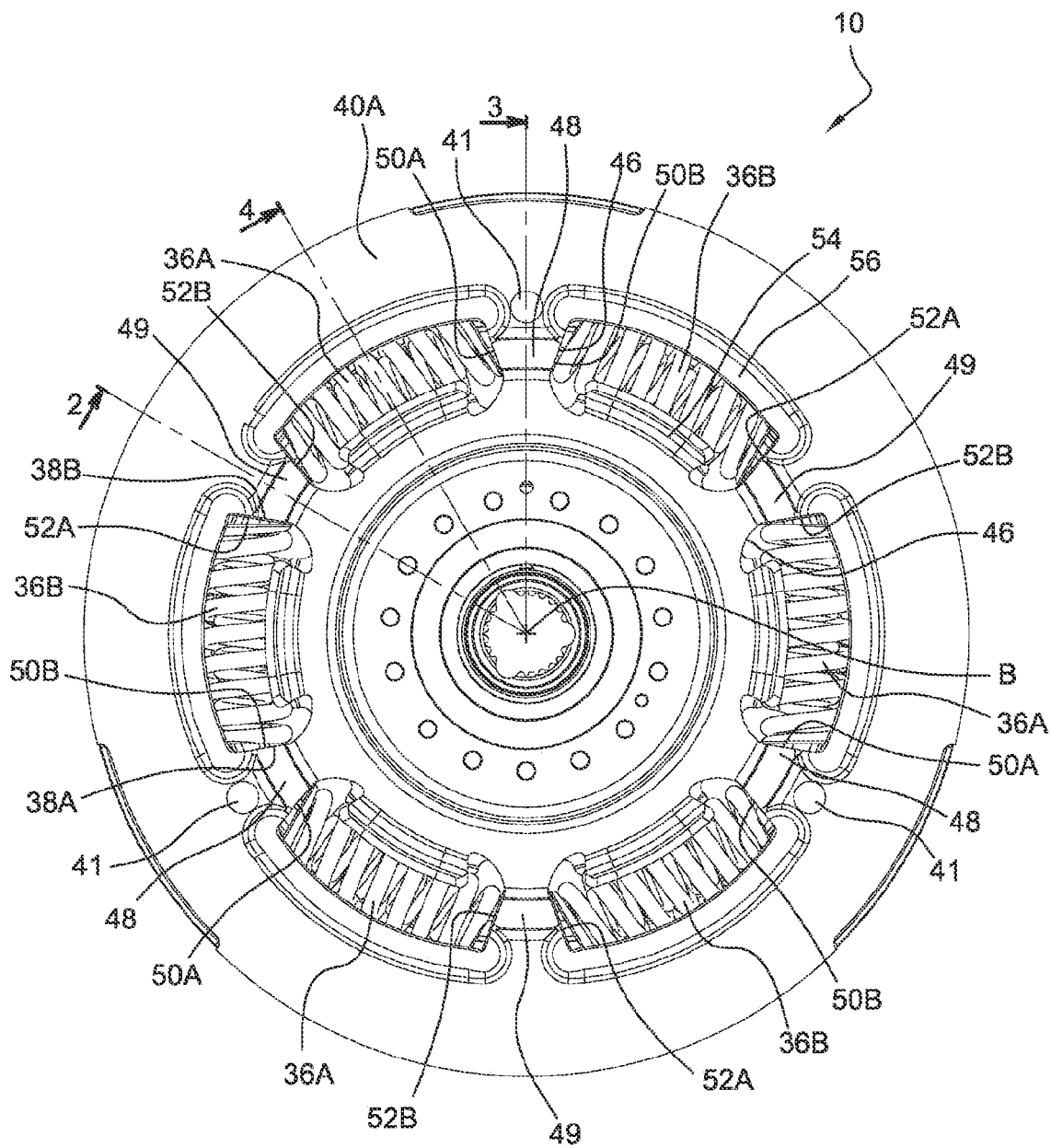
FIG. 1 is a frontal view depicting a damping device implemented according to the teaching of the invention.
Figure 5:
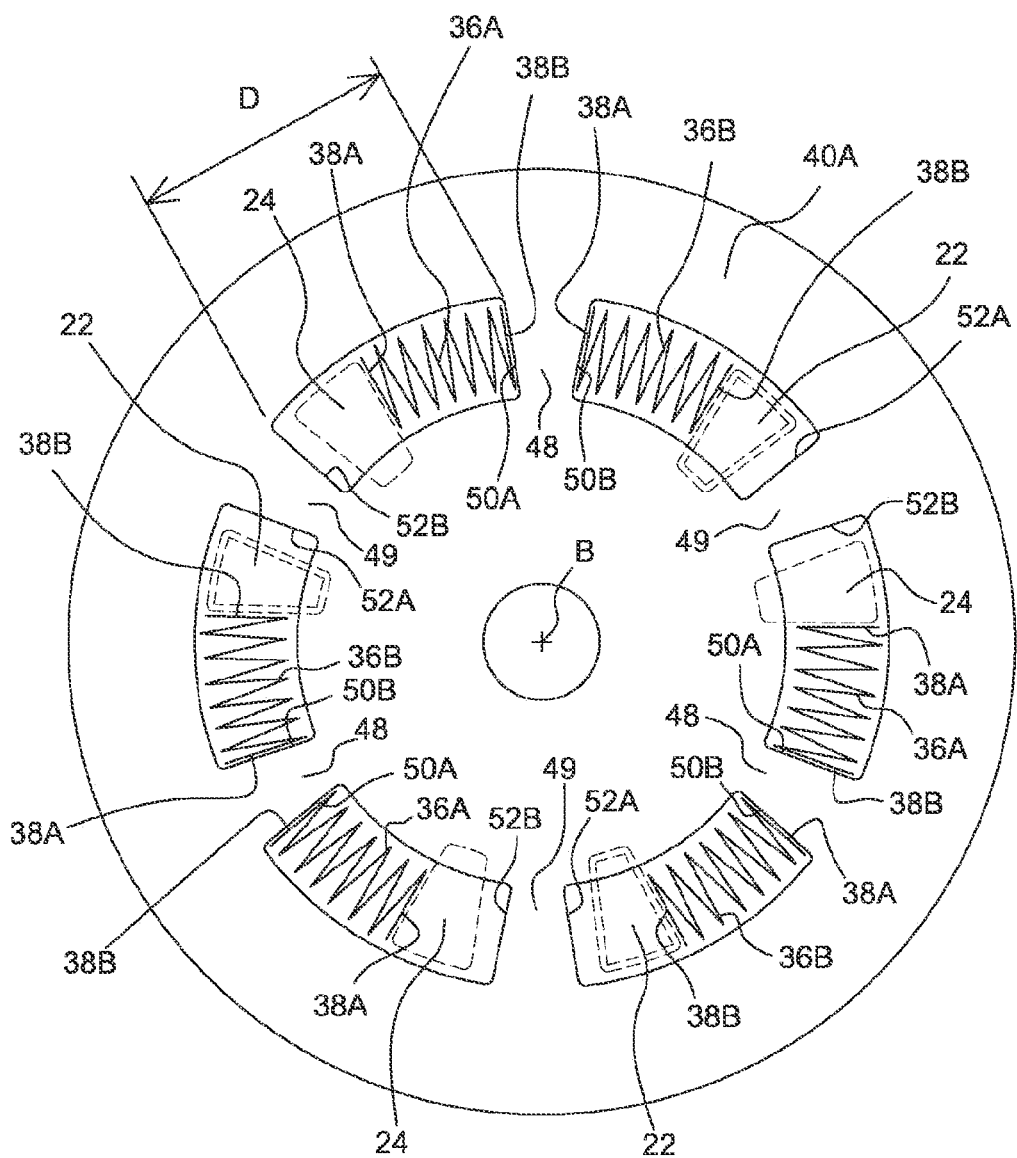
FIG. 5 is a schematic frontal view depicting the torsion damping device of FIG. 1 when a torque is being transmitted from the input element to the output element, the input element tabs being depicted with dashed fines and the output element tabs being depicted with double dashed lines.
Figure 6:
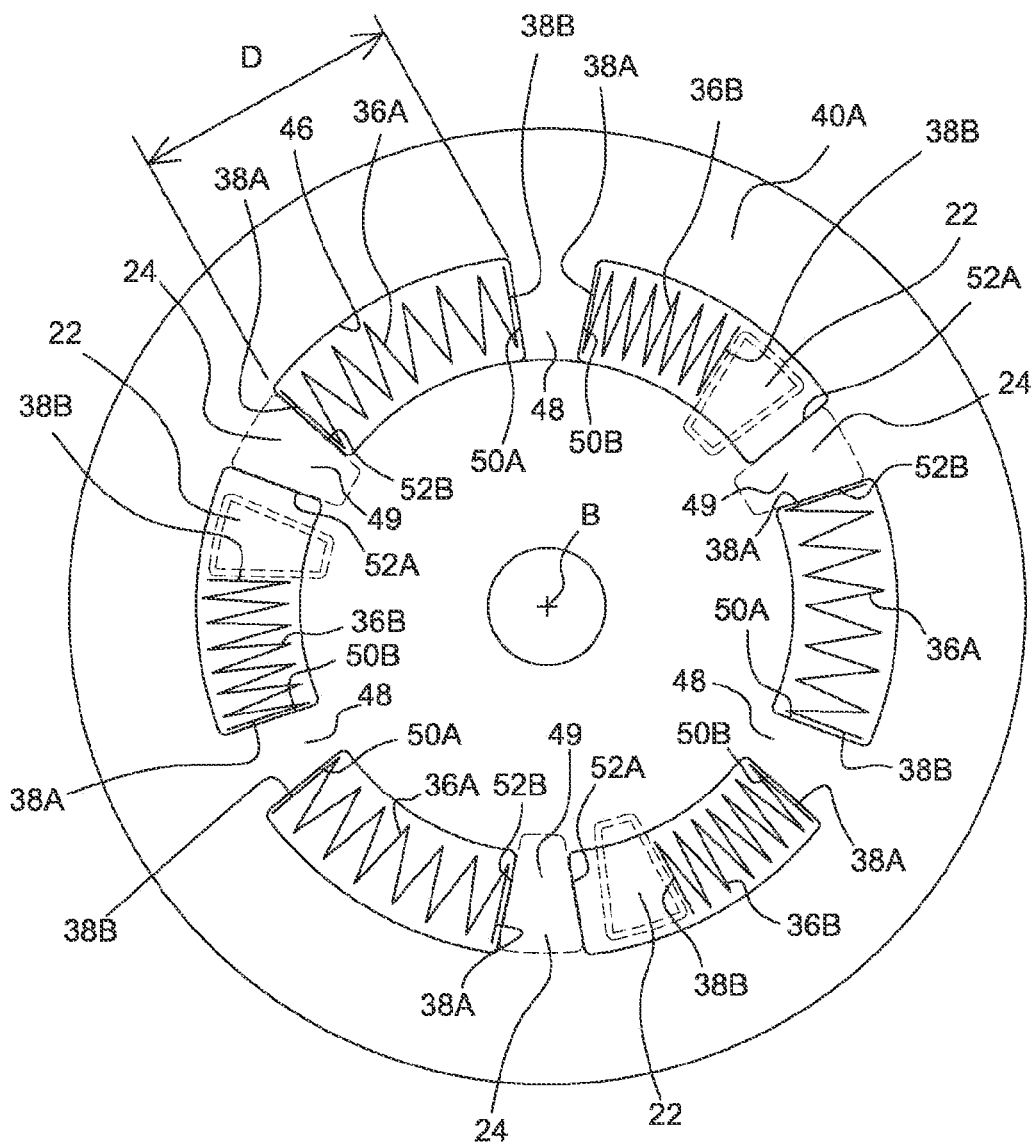
FIG. 6 is a schematic view similar to that of FIG. 5, depicting the torsion damping device of FIG. 1 when a torque is being transmitted from the phase washers to the output element.

The terms "upstream" and "downstream" will be used hereinafter based on a clockwise rotation around axis B as shown in FIGS. 1, 5, and 6.

For the remainder of the description, elements having similar, identical, or analogous functions will be labeled with the same reference numbers.

FIG. 1 depicts a torsion damping device 10 implemented according to the teaching of the invention. Damping device 10 is intended to be arranged in an automotive temporary coupling system.

The damping device 10 is more particularly intended to be arranged in a hydrodynamic torque converter 2 in order to couple a torque converter housing, with torque damping, to an input shaft of an automatic transmission.

The damping device 10 also advantageously allows a turbine wheel 4 of the converter to be coupled, with torque damping, to the input shaft of the automatic transmission.

Torque damping device 10 allows damping of the stress between a first, drive shaft 6 and a second, driven shaft (not depicted) that are coaxial with axis B, with torsion damping.

Figure 2:
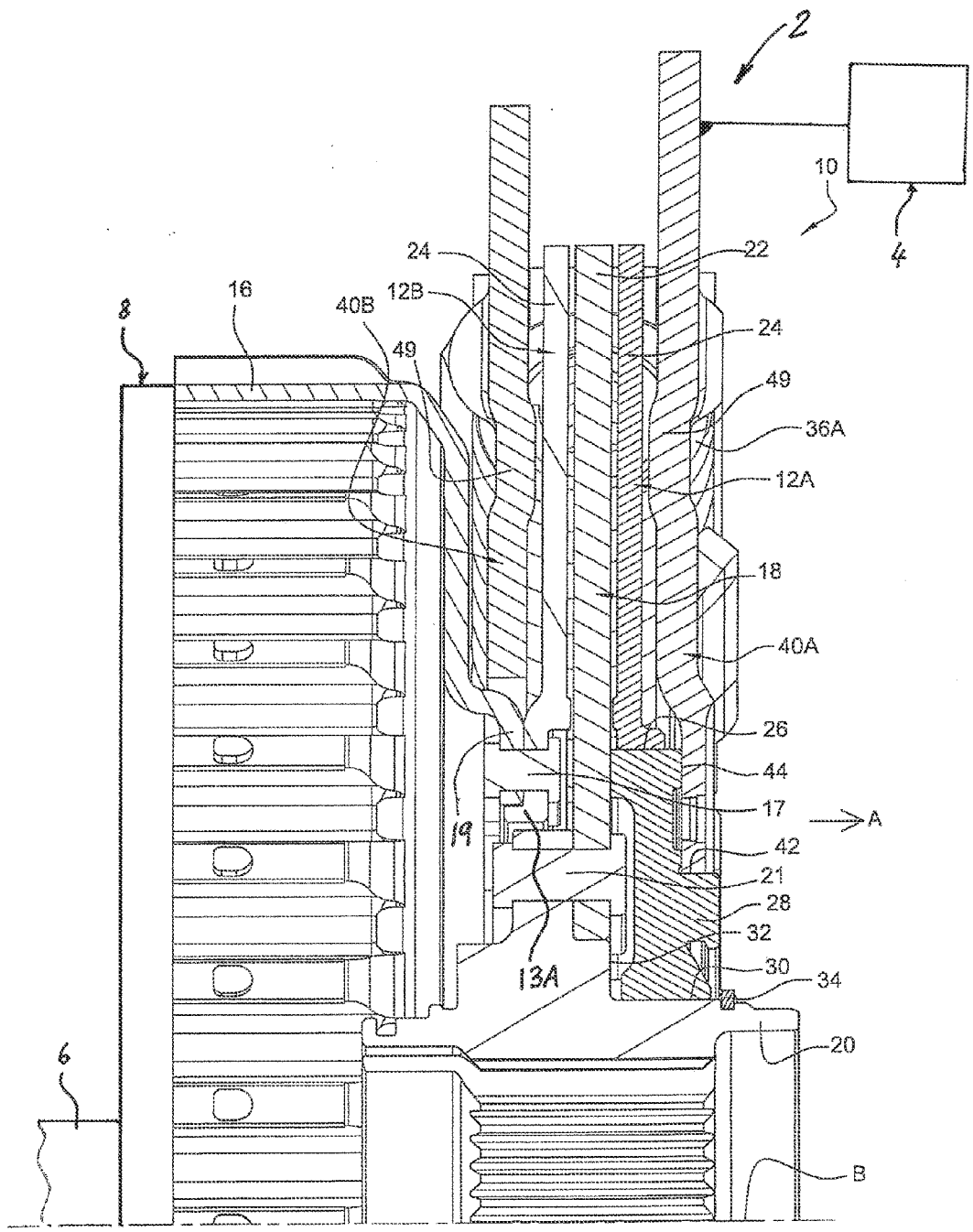
FIG. 2 is a sectioned view along section plan 2-2 of FIG. 1, depicting in particular the phasing tabs.

As depicted in FIG. 2, damping device 10 has a torque input element that is constituted here by a first, front radial input washer 12A and a second, rear radial input washer 12B. Input washers 12A, 12B are parallel to one another.

Figure 3:
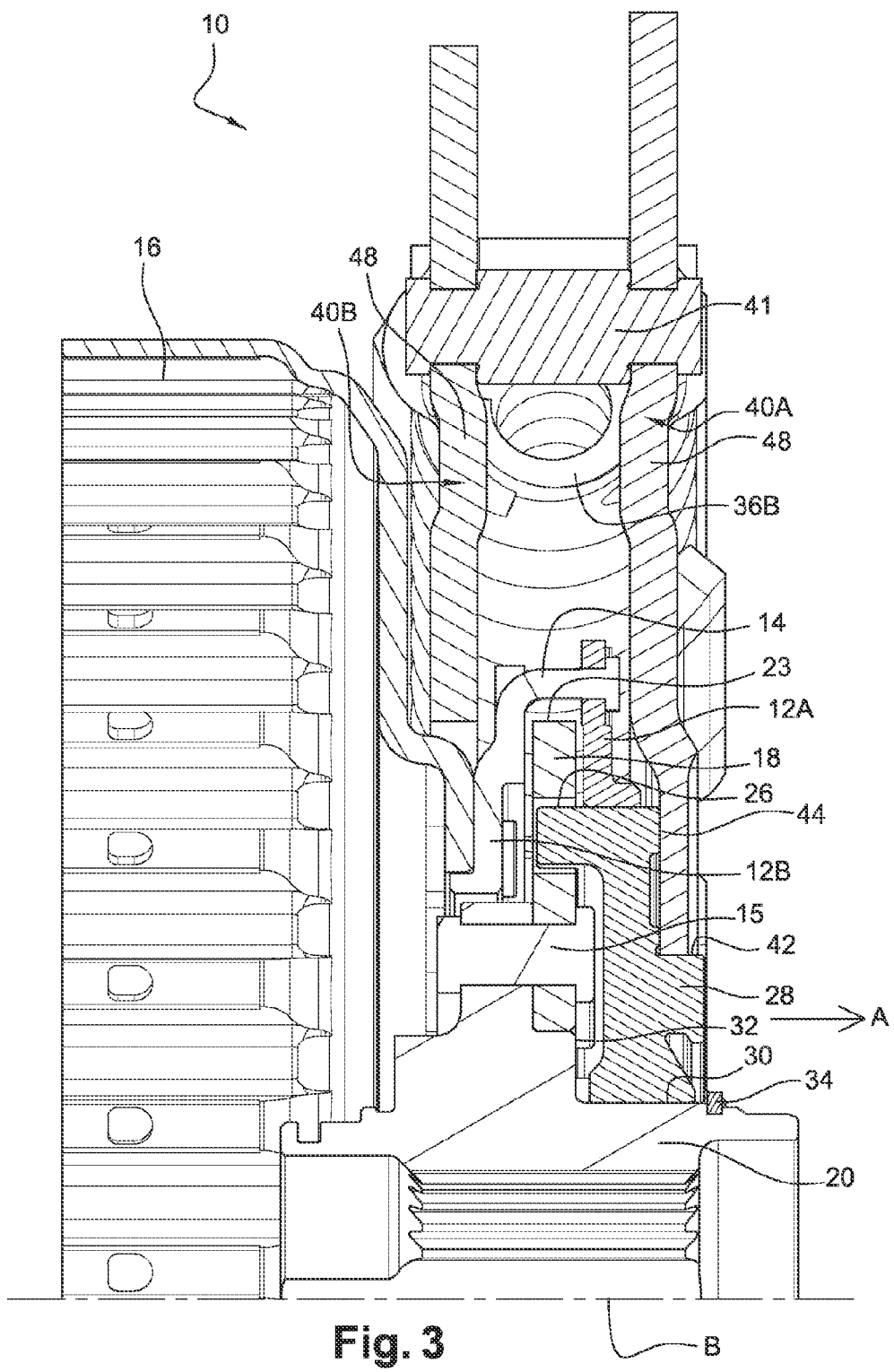
FIG. 3 is a sectioned view along section plane 3-3 of FIG. 1, depicting in particular a tab of a torque input element and a tab of a torque output element.

The rear input washer 12B is non-rotatably connected to the front input washer 12A by means of axial arms 14, as depicted in FIG. 3.

The two input washers 12A, 12B are selectively connectable to the first, drive shaft 6 by means of a locking clutch 8 through a splined drive hub 16, also called a "plate carrier hub," intended to receive friction plates of the locking clutch mounted slidingly on said hub. The drive hub 16 is an element of the locking clutch 8 that is capable of temporarily coupling the converter housing to the transmission input shaft by means of the torsion damping device 10. A locking clutch of this kind, sometimes also called a "lock-up" clutch, is well known and will not be discussed in detail hereinafter.

The drive hub 16 is arranged behind damping device 10. The rear input washer 12B is fastened i.e., non-rotatably connected) to drive hub 16 by means of rivets 17, one of which is depicted in FIG. 2, such that a radially inner portion 19 of the drive hub 16 is non-rotatably connected to a radially inner portion 13A of the rear torque input element 12B.

Damping device 10 also has a torque output element that is constituted here by a radial output web 18. Output web 18 is in the shape of a circular washer coaxial with axis B.

The output web 18 is intended to be non-rotatable connected to the second, driven shaft by means of a driven hub 20. The output web 18 is non-rotatable connected to driven hub 20 by means of rivets 21, one of which is depicted in FIG. 2.

Output web 18 has three radial output tabs 22, one of which is visible in FIG. 2. Output tabs 22 are arranged regularly around axis B, globally 120° from one another. Each output tab 22 projects radially with respect to outer peripheral edge 23 of output web 18. Outer peripheral edge 23 is visible in FIGS. 3 and 4.

Output web 18 is arranged axially between the two input washers 12A, 12B. When the two washers 12A, 12B are assembled, they are spaced apart by an axial distance sufficient to allow output web 18 to rotate between the two input washers 12A, 12B without abrasion.

Each input washer 12A, 12B has a radial flange that is provided with a central passage to allow the passage of the driven shaft and of driven hub 20.

Each input washer 12A, 12B furthermore has three outer input tabs 24 that are arranged circumferentially regularly around the axis B in correspondence with output tabs 22 of output web 18. One of the input tabs 24 of each input washer 12A, 12B is depicted in FIG. 2.

Front input washer 12A is rotationally guided by a first, outer cylindrical guidance surface 26 of a central bearing 28. Bearing 28 is in turn mounted rotatably on an outer cylindrical surface 30 of a front segment of driven hub 20. Axial displacements of bearing 28 are limited toward the rear by a shoulder surface 32 of driven hub 20, while they are limited axially toward the front by a snap ring 34 that is mounted on driven hub 20.

Damping device 10 furthermore has first circumferentially acting elastic members 36A and second circumferentially acting elastic members 36B. First and second elastic members 36A and 36B are here identical to one another.

In non-limiting fashion, damping device 10 here has six elastic members 36A, 36B, as visible in FIG. 1. Elastic members 36A, 36B are constituted by helical springs having a principal axis oriented substantially circumferentially.

Each elastic member 36A, 36B has a first, upstream end face 38A and an opposite second, downstream end face 38B.

As is visible in FIG. 1, elastic members 36A, 36B are arranged in series on the circumference of a single circle, surrounding peripheral edge 23 of web 18, in such a way that second, downstream end face 38B of an elastic member 36A, 36B is arranged circumferentially oppositely to first, upstream end face 38A of the next elastic member 36B, 36A in a clockwise direction.

Elastic members 36A, 36B are distributed into three pairs of elastic members 36A, 36B. Elastic members 36A, 36B of each pair are housed circumferentially in series, i.e. end to end, between two output tabs 22 of output web 18. Each pair thus has a first, upstream elastic member 36A and a second, downstream elastic member 36B. Each of said first, upstream elastic member 36A and second, downstream elastic member 36B has an upstream face 38A and a downstream face 38B.

Because the two elastic members 36A, 36B of each pair are mounted in series, downstream end face 38B of upstream elastic member 36A is capable of coming into abutment against upstream end face 38A of downstream elastic member 36B while a torque is being transmitted between input washers 12A, 12B and output web 18.

In order for elastic members 36A, 36B to be loaded substantially along their principal circumferential axis, it is known to equip damping device 10 with a phasing member.

A phasing member of this kind is constituted here by a first, front radial phase washer 40A and a second, rear phase washer 40B, each in the shape of an annular washer coaxial with the axis B. Second radial phase washer 40B is arranged parallel to first phase washer 40A. Phase washers 40A, 40B are arranged axially on either side of input washers 12A, 12B and elastic members 36A, 36B.

As illustrated in FIG. 3, rear phase washer 40B is fastened to front phase washer 40A by means of spacers 41 on an axial axis. Each end of spacer 41 is fastened to an associated phase washer 40A, 40B, here by deformation of said end in the manner of a rivet.

Spacers 41 allow the two phase washers 40A, 40B to be kept spaced axially a constant distance apart. When the two phase washers 40A, 40B are assembled, their flanges are spaced a sufficient distance apart to allow input washers 12A, 12B to rotate without abrasion.

The axial spacing distance between the two phase washers 40A, 40B is less than the diameter of elastic members 36A, 36B.

The phase washers 40A, 40B are mounted freely rotatably about the axis B and with respect to output web 18 on the one hand, and with respect to input washers 12A, 12B on the other hand.

Front phase washer 40A is mounted to rotate freely on a second cylindrical guidance surface 42 of bearing 28. Second cylindrical guidance surface 42 is arranged axially in front of first cylindrical guidance surface 26. Second cylindrical guidance surface 42 has a diameter less than that of first cylindrical guidance surface 26 of bearing 28. A front-facing radial shoulder surface 44 separates the two cylindrical guidance surfaces 26, 42.

Front phase washer 40A abuts axially toward the rear against said shoulder surface 44 in order to axially position phase washers 40A, 40B with respect to input washers 12A, 12B.

Figure 4:
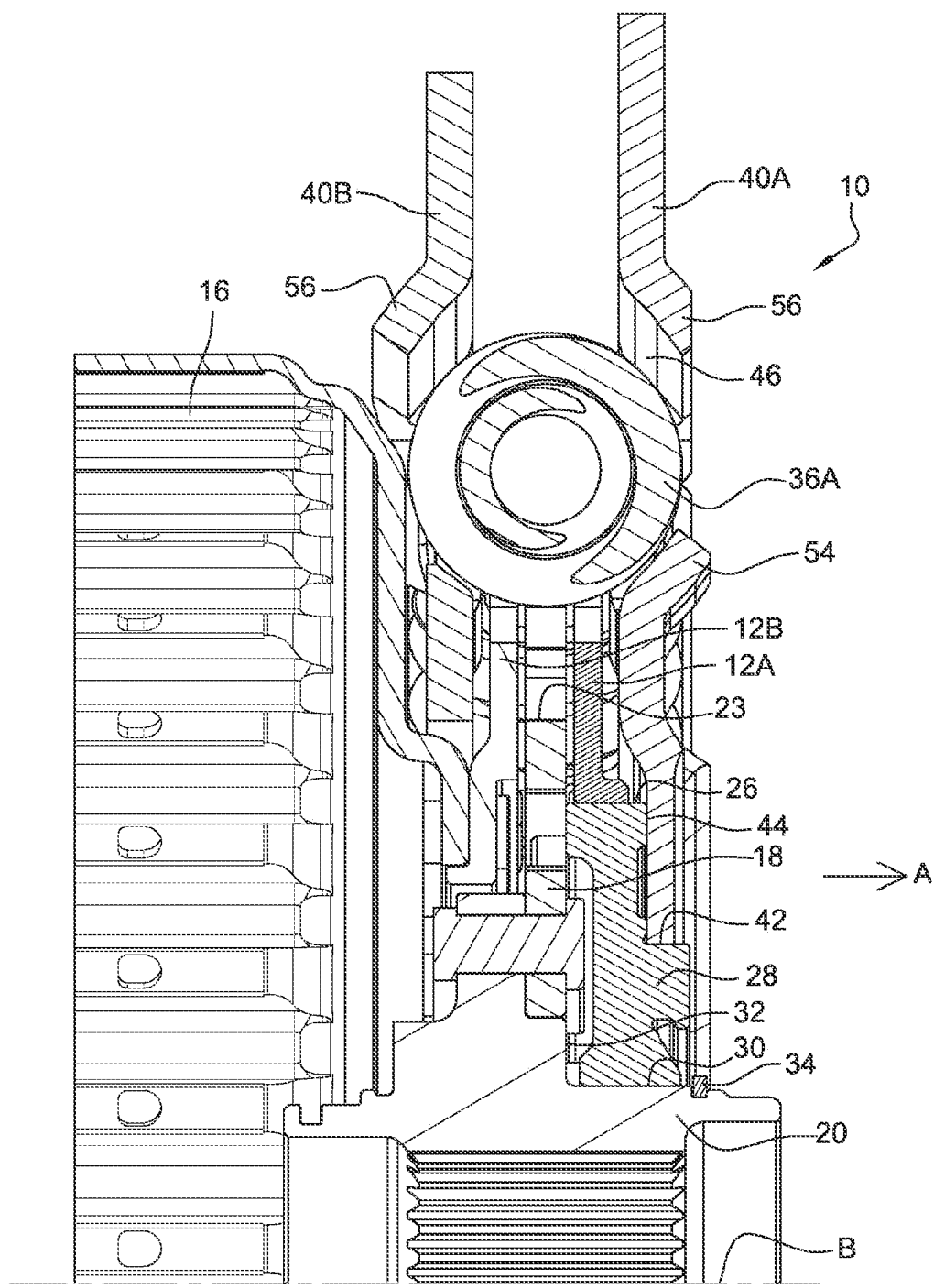
FIG. 4 is a sectioned view along section plane 4-4 of FIG. 1, depicting in particular a receptacle for an elastic member.

Each phase washer 40A, 40B is furthermore penetrated by six windows 46, each of which is arranged in correspondence with an associated elastic member 36A, 36B, as depicted in FIGS. 1 and 4.

Windows 46 are separated circumferentially from one another alternately by radial phasing tabs 48 and by retention tabs 49. Each phase washer 40A, 40B thus has three phasing tabs 48 and three retention tabs 49, a phasing tab 48 alternating circumferentially with a retention tab 49.

Phasing tabs 48 of first phase washer 40A are arranged in axial correspondence with phasing tabs 48 of second phase washer 40B. The same is true of retention tabs 49.

Phasing tabs 48 are depicted in FIG. 3. Each phasing tab 48 curves in toward the associated input washer 12A, 12B.

As depicted in FIG. 3, each phasing tab 48 is interposed circumferentially between the two elastic members 36A, 36B in series of each pair.

Each phasing tab 48 is delimited circumferentially by a first, upstream radial phasing face 50A on the one hand, and by a second, downstream radial phasing face 50B on the other hand. Upstream and downstream phasing faces 50A, 50B that are interposed between elastic members 36A, 36B of a single pair are thus carried by one common radial phasing tab 48.

Downstream end face 38B of each first, upstream elastic member 36A is thus capable of loading or of being loaded by upstream radial phasing face 50A of the associated phasing tab 48, while upstream end face 38A of each second, downstream elastic member 36B is capable of being loaded by or of loading downstream radial phasing face 50B of the associated phasing tab 48, so that the two upstream 36A and downstream elastic members 36B of the pair are mounted in series by means of phase washers 40A, 40B.

Retention tabs 49 are depicted in FIG. 2; their shape is identical to that of phasing tabs 48.

As depicted in FIGS. 1 and 2, each retention tab 49 is interposed circumferentially between two pairs of elastic members 36A, 36B. More precisely, each retention tab 49 is interposed circumferentially between downstream elastic member 36B of one pair and upstream elastic member 36A of the next pair. Each retention tab 49 is thus arranged in correspondence with one input tab 24 and one output tab 22.

Each retention tab 49 is delimited circumferentially by a first, upstream radial retention face 52A on the one hand, and by a second, downstream radial retention face 52B on the other hand.

Downstream end face 38B of each second, downstream elastic member 36B is thus capable of interacting with upstream radial face 52A of the associated retention tab 49, while upstream end face 38A of each first, upstream elastic member 36A is capable of interacting with downstream radial retention face 52B of the associated retention tab 49.

Each elastic member 36A, 36B is thus retained individually in position, along the circumferential direction, between an associated phasing face 50A, 50B and an oppositely located associated retention face 52A, 52B.

The distance D separating a retention face 52A, 52B from the oppositely located phasing face 50B. 50A is equal to at most the circumferential length of elastic member 36A, 36B at rest.

Thus, when upstream elastic members 36A are not loaded by the passage of torque, downstream face 38B of each upstream elastic member 36A is retained in circumferential abutment against the associated upstream phasing face 50A by the associated oppositely located downstream radial retention face 52B, which is in contact with upstream face 38A of said upstream elastic member 36A received between said upstream phasing face 50A and said downstream retention face 52B.

Similarly, when downstream elastic members 36B are not loaded by the passage of torque, upstream face 38A of each downstream elastic member 36B is retained in circumferential abutment against the associated downstream phasing face 50B by the associated oppositely located upstream radial retention face 52A, which is in contact with downstream face 38B of said downstream elastic member 36B received between said downstream phasing face 50B and said upstream retention face 52A.

The circumferential distance between a phasing face and the oppositely located retention face is preferably less than the length of the elastic member at rest, so that the elastic member is received in circumferentially constrained fashion between retention tab 49 and phasing tab 48.

Phase washers 40A, 40B constitute guidance members for elastic members 36A, 36B. For this purpose, each window 46 is bounded
   radially inwardly by an inner lug 54 that extends as far as an inner circumferential edge of window 46, and
   radially outwardly by an outer lug 56 that extends as far as an outer circumferential edge of window 46.

Lugs 54, 56 constitute an axial retainer for the associated elastic member 36A, 36B.

Each window 46 thus forms a receptacle for receiving an associated elastic member 36A, 36B, and for retaining them in position axially and radially. Lugs 54, 56 and the edges of windows 46 thus allow elastic members 36A, 36B to be captured in order to retain them in position. As illustrated in FIGS. 1, 5 and 6, each of the windows 46 receives only one of the elastic members 36A, 36B.

Because the phase washers 40A, 40B are non-rotatably connected to the turbine wheel 4 of the torque converter 2, the damping device 10 is capable of functioning in two modes:
   a first, "locked" operating mode in which the locking clutch 8 is in an engaged state and in which drive torque is transmitted from the drive shaft 6 to the torque input washers 12A, 12B;
   a second, "transitional" operating mode in which the locking clutch 8 is in a disengaged state and in which drive torque is transmitted from the drive shaft 6 to the phase washers 40A, 40B via the turbine wheel 4.

The operation of damping device 10 in the first, "locked" mode is illustrated in FIG. 5, in which the position of input tabs 24 has been outlined with dashed lines while the position of output tabs 22 has been outlined with double dashed lines. In this first operating mode, elastic members 36A, 36B of each pair are compressed between input tabs 24 and output tabs 22 in order to damp abrupt changes in torque.

More specifically, each input tab 24 loads the associated upstream elastic member 36A. Upstream elastic member 36A conveys this force to second, downstream elastic member 36B via phasing tab 48. Lastly, second, downstream elastic member 36B transmits the force to the associated output tab 22.

Input washers 12A, 12B rotate through a defined angle around axis B with respect to output web 18, causing simultaneous compression of the two elastic members 36A, 36B of each pair. Phasing tabs 48 of phase washers 40A, 40B transmit the compressive force from one elastic member 36A, 36B to the other. Because of this compression, phase washers 40A, 40B rotate through half the defined angle with respect to input washers 12A, 12B.

The second, "transitional" operating mode is illustrated in FIG. 6. In this second operating mode, a portion of the drive torque is transmitted from phase washers 40A, 40B to output web 18 via downstream elastic member 36B of each pair.

No torque is transmitted to torque input washers 12A, 12B. As a result, upstream elastic members 36A are not loaded.

Only downstream elastic members 36B are therefore compressed. Upstream elastic members 36A are immobilized circumferentially between downstream retention face 52B of retention tabs 49 and upstream phasing face 50B of phasing tabs 48. Upstream elastic members 36A are therefore not capable of sliding circumferentially. This ensures quiet operation of damping device 10 in this second operating mode.

The invention claimed is:

1. A torsion damping device (10) between an axially oriented coaxial drive shaft and driven shaft in an automotive temporary coupling system, the device (10) comprising:
   a torque input element (12A, 12B) and a torque output element (18);
   at least one first, upstream circumferentially acting elastic member (36A), an upstream circumferential end face (38A) of which is capable of being loaded by or of loading the torque input element (12A, 12B);
   at least one second, downstream circumferentially acting elastic member (36B), a downstream circumferential end face (38B) of which is capable of loading or of being loaded by the output element (18);
   at least one first radial phase washer (40A, 40B) rotatable with respect to the torque input element (12A, 12B) and the torque output element (18), the at least one first radial phase washer (40A, 40B) having at least two windows (46);
   the downstream end face (38B) of the at least one upstream elastic member (36A) being capable of loading or of being loaded by an upstream radial phasing face (50A) of the at least one first radial phase washer (40A, 40B), and the upstream end face (38A) of the at least one downstream elastic member (36B) being capable of being loaded by or of loading a downstream radial phasing face (50B) of the at least one first radial phase washer (40A, 40B), such that the two elastic members (36A, 36B) are mounted in series; and
   a drive hub (16) non-rotatably connected to the torque input element (12A, 12B) such that a radially inner portion of the drive hub (16) is non-rotatably connected to a radially inner portion of the torque input element (12A, 12B);
   each of the at least two windows (46) receiving only one of the at least one upstream elastic member (36A) or the at least one downstream elastic member (36B) so that each of the upstream and downstream elastic members (36A, 36B) is received circumferentially between the associated phasing face (50A, 50B) and an associated oppositely located radial retention face (52B, 52A) of the at least one first radial phase washer (40A, 40B).

2. The device (10) according to claim 1, wherein the elastic members (36A, 36B) are arranged on the circumference of a single circle, the phasing faces (50A, 50B) thus being carried by one common radial phasing tab (48) of the at least one first radial phase washer (40A, 40B) which is interposed between the upstream elastic member (36A) and the downstream elastic member (36B).

3. The device (10) according to claim 1, wherein the device (10) comprises first and second radial phase washers (40A, 40B) that are arranged axially on either side of the input and output elements (12A, 12B, 18) and that are fastened onto one another; and wherein the phase washers (40A, 40B) have means for capturing the elastic members (36A, 36B) in order to retain them axially and radially in position.

4. The device (3) according to claim 3, wherein each of the first and second radial phase washers (40A, 40B) is in the shape of an annular washer coaxial with the torque input element (12A, 12B) and the torque output element (18).

5. The device (10) according to claim 4, wherein the first and second radial phase washers (40A, 40B) are axially spaced from each other.

6. The device (10) according to claim 5, wherein the first and second radial phase washers (40A, 40B) are non-rotatably fastened to each other.

7. The device (10) according to claim 1, wherein the at least one first radial phase washer (40A, 40B) is in the shape of an annular washer coaxial with the torque input element (12A, 12B) and the torque output element (18).

8. The device (10) according to claim 1, wherein the at least one first radial phase washer (40A, 40B) is axially spaced from the torque input element (12A, 12B).

9. The device (10) according to claim 1, wherein the drive hub (16) selectively connectable to the drive shaft through a locking clutch.

10. The device (10) according to claim 1, wherein a circumferential distance (D) between the phasing face (50A, 50B) and the oppositely located retention face (52B, 52A) being equal to or less than the circumferential length of the elastic member at rest.

11. The device (10) according to claim 10, wherein the circumferential distance (D) between each of the upstream and downstream phasing faces (50A, 50B) and the oppositely located retention face (52B, 52A) is less than the length of the elastic member (36A, 36B) at rest, so that the elastic member (36A, 36B) is received in circumferentially constrained fashion between the retention face (52A, 52B) and the associated phasing face (50B, 50A).

12. The device (10) according to claim 1, further comprising a bearing (28) having a first cylindrical guidance surface (26) and a second cylindrical guidance surface (42) arranged axially in front of the first cylindrical guidance surface (26), wherein the first cylindrical guidance surface (26) has a diameter different than a diameter of the second cylindrical guidance surface (42) of the bearing (28), and wherein the at least one first radial phase washer (40A, 40B) is mounted to rotate freely on the second cylindrical guidance surface (42) of the bearing (28).

13. The device (10) according to claim 12, wherein the first cylindrical guidance surface (26) of the bearing (28) is separated from the second cylindrical guidance surface (42) by a front facing radial shoulder surface (44) radially extending between the first cylindrical guidance surface (26) and the second cylindrical guidance surface (42); and wherein the at least one first radial phase washer (40A, 40B) abuts axially against the front facing radial shoulder surface (44) in order to axially position the at least one first radial phase washer (40A, 40B) with respect to the torque input element (12A, 12B).

14. A hydrodynamic converter comprising a turbine wheel, a locking clutch comprising a drive hub (16) and a torsion damping device (10), the torsion damping device (10) comprising:
  a torque input element (12A, 12B) and a torque output element (18);
  at least one first, upstream circumferentially acting elastic member (36A), an upstream circumferential end face (38A) of which is capable of being loaded by or of loading the input element (12A, 12B);
  at least one second, downstream circumferentially acting elastic member (36B), a downstream circumferential end face (38B) of which is capable of loading or of being loaded by the output element (18); and
  at least one first radial phase washer (40A, 40B) rotatable with respect to the torque input element (12A, 12B) and the torque output element (18), the downstream end face (38B) of each upstream elastic member (36A) being capable of loading or of being loaded by an upstream radial phasing face (50A) of the phase washer (40A, 40B), and the upstream end face (38A) of each downstream elastic member (36B) being capable of being loaded by or of loading a downstream radial phasing face (50B) of the phase washer (40A, 40B), such that the two elastic members (36A, 36B) are mounted in series;
  a radially inner portion of the drive hub (16) is non-rotatably connected to a radially inner portion of the torque input element (12A, 12B);
  each of the elastic members (36A, 36B) is received circumferentially between the associated phasing face (50A, 50B) and an associated oppositely located radial retention face (52B, 52A) of the phase washer (40A, 40B);
  the at least one first radial phase washer (40A, 40B) being non-rotatably connected to the turbine wheel while the torque input element (12A, 12B) being non-rotatably connected to the locking clutch.

15. The hydrodynamic converter according to claim 14, wherein a circumferential distance (D) between the phasing face (50A, 50B) and the oppositely located retention face (52B, 52A) being equal to or less than the circumferential length of the elastic member at rest.

16. A hydrodynamic converter comprising a turbine wheel, a locking clutch comprising a drive hub (16) and a torsion damping device (10), the torsion damping device (10) comprising:
  a torque input element (12A, 12B) having input tabs (24) arranged circumferentially regularly and a torque output element (18) having output tabs (22) arranged circumferentially regularly;
  first, upstream circumferentially acting elastic members (36A), an upstream circumferential end face (38A) of each of the first circumferentially acting elastic members (36A) is capable of being loaded by or of loading the input element (12A, 12B);
  second, downstream circumferentially acting elastic members (36B), a downstream circumferential end face (38B) of each of the second circumferentially acting elastic members (36B) is capable of loading or of being loaded by the output element (18);
  first and second radial phase washers (40A, 40B) each rotatable with respect to the torque input element (12A, 12B) and the torque output element (18), each of the first and second radial phase washer (40A, 40B) having a plurality of windows (46);
  the downstream end face (38B) of each upstream elastic member (36A) being capable of loading or of being loaded by an upstream radial phasing face (50A) of each of the phase washers (40A, 40B), and the upstream end face (38A) of the at least one downstream elastic member (36B) being capable of being loaded by or of loading a downstream radial phasing face (50B) of each of the phase washers (40A, 40B), such that the two elastic members (36A, 36B) are mounted in series;
  a radially inner portion of the drive hub (16) is non-rotatably connected to a radially inner portion of the torque input element (12A, 12B);

each of the windows (46) receiving only one of the upstream elastic members (36A) or the downstream elastic members (36B) so that each of the elastic members (36A, 36B) is received circumferentially between the associated phasing face (50A, 50B) and an associated oppositely located radial retention face (52B, 52A) of each of the phase washers (40A, 40B);

each of the phase washers (40A, 40B) being non-rotatably connected to the turbine wheel while the torque input element (12A, 12B) is non-rotatably connected to the locking clutch.

17. The hydrodynamic converter according to claim 16, wherein each of the first and second radial phase washers (40A, 40B) is in the shape of an annular washer coaxial with the torque input element (12A, 12B) and the torque output element (18).

18. The hydrodynamic converter according to claim 17, wherein the first and second radial phase washers (40A, 40B) are axially spaced from each other.

19. The hydrodynamic converter according to claim 18, wherein the first and second radial phase washers (40A, 40B) are non-rotatably fastened to each other.

20. The hydrodynamic converter according to claim 16, wherein a circumferential distance (D) between the phasing face (50A, 50B) and the oppositely located retention face (52B, 52A) being equal to or less than the circumferential length of the elastic member at rest.

* * * * *